July 24, 1928. 1,678,291
G. E. HOWARD
METHOD AND APPARATUS FOR FEEDING MOLTEN GLASS
Filed Dec. 4, 1922
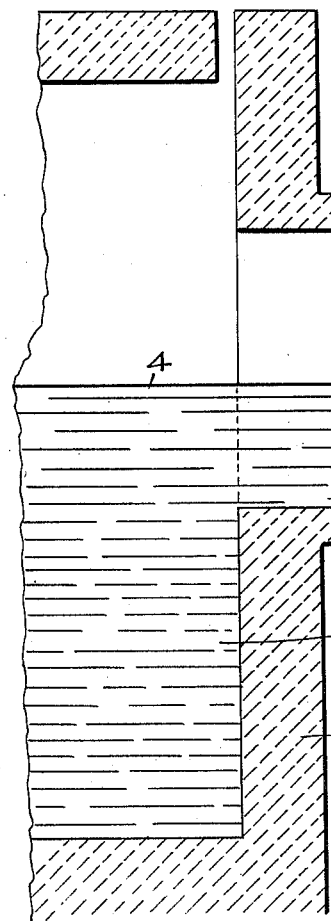
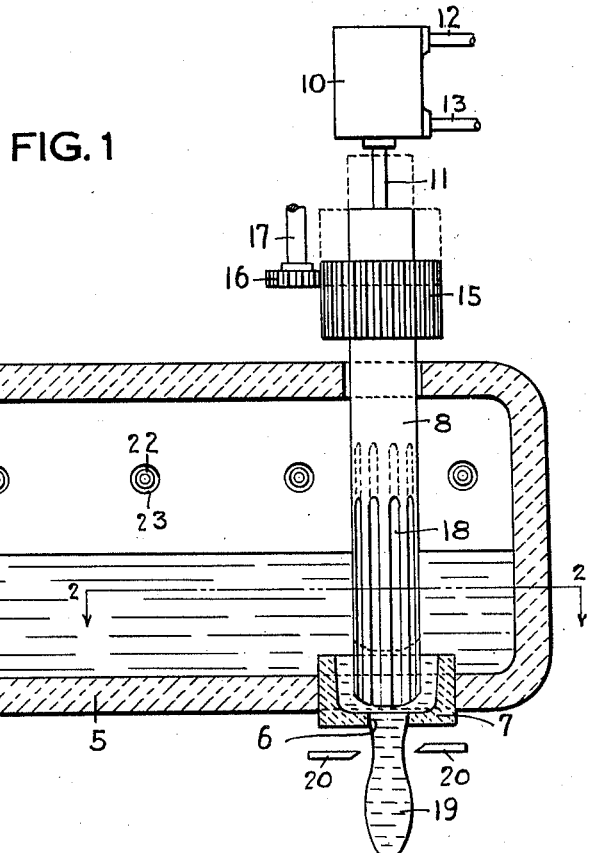
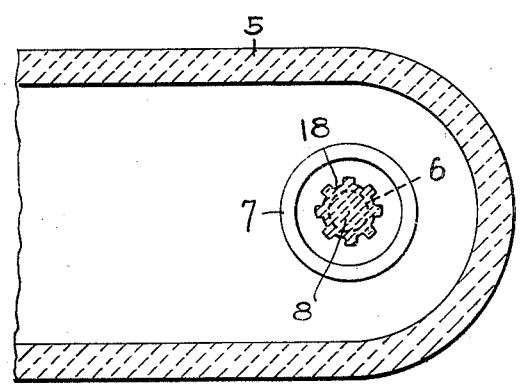
INVENTOR
George E. Howard
By Kay, Totten Brown,
Attorneys Patented July 24, 1928.

1,678,291

UNITED STATES PATENT OFFICE.

GEORGE E. HOWARD, OF BUTLER, PENNSYLVANIA, ASSIGNOR, BY MESNE ASSIGNMENTS, TO HARTFORD-EMPIRE COMPANY, OF HARTFORD, CONNECTICUT, A CORPORATION OF DELAWARE.

METHOD AND APPARATUS FOR FEEDING MOLTEN GLASS.

Application filed December 4, 1922. Serial No. 604,785.

My invention relates to the production of mold charges of molten glass, and one of its objects is to provide an improved method for causing each mold charge to be uniform in temperature, or at least symmetrical in temperature, at the time when it is delivered into the mold.

Another object of my invention is to provide improved apparatus for carrying out this method.

To these ends, I provide a receptacle for the glass, usually a tank furnace having an extension or forehearth provided with a downwardly opening outlet, and an impelling member in the nature of a plunger which is arranged to reciprocate in line with the outlet opening, and is also arranged to be rotated either continuously or intermittently and, if intermittently, either at the top of its stroke, at the bottom of its stroke, or at an intermediate point in its ascent or descent.

In the accompanying drawing, Fig. 1 is a vertical sectional view taken longitudinally through the finishing end of a tank furnace equipped with feeding apparatus constructed in accordance with my invention; and Fig. 2 is a partial horizontal sectional view, the section being taken substantially on the line 2—2, Fig. 1.

When molten glass is caused to flow into a container, such as the forehearth of a tank furnace, and is then delivered through a discharge opening, the issuing glass has a tendency to stratification or non-uniformity in temperature which is due to the fact that some of the glass flows into the discharge outlet directly from the hot body of glass in the furnace or other container while another part of the glass flows into the discharge outlet from the mass of glass which has already accumulated in the feeding receptacle and which has had time to cool somewhat through radiation of heat through the walls of the receptacle. Such stratification causes unevenness in the finished glassware and makes it necessary that the bottle or other article be made heavier than would otherwise be required, in order that its thinnest portion shall be sufficiently strong. Also, uneven wavy streaks are produced in the ware which greatly injure its appearance.

Various means have been employed for correcting, to a greater or less degree, this tendency to stratification in the feeding of molten glass, among which may be mentioned the use of heating flames for keeping the glass already in the feeding receptacle at approximately the same temperature as the glass flowing into the receptacle from the tank, the use of baffles or channels for dividing the incoming glass and causing it to approach the flow outlet from different directions, and the use of air blasts for cooling the incoming hot glass to approximately the same temperature as the glass already in the feeding receptacle.

My present invention relates to another method of correcting uneven temperature conditions in the feeding of molten glass by the use of a rotary plunger member which acts to stir the glass adjacent to the flow opening so as to keep the glass in the feeding receptacle at a uniform temperature. If the glass in the feeding receptacle should be so uneven in temperature and consistency that the rotary plunger cannot produce a truly homogeneous condition, the portions of glass having different temperatures will be so rotated together as to distribute themselves evenly in the discharged gathers.

The rotary plunger may or may not be used to assist in the expulsion of the glass through the flow opening and in shaping the discharged gathers of glass, in addition to its function as a stirring or mixing member.

Referring to the drawing, the numeral 2 indicates a portion of a tank furnace containing molten glass 3, the metal line or upper level of which is shown at 4. An extension or forehearth 5, having its bottom above the bottom of the tank but below the glass level or metal line 4, receives the glass, which is discharged through a flow opening 6. As shown, the flow opening 6 is contained in a bushing 7 according to the usual practice in apparatus of this kind.

Arranged above the flow opening 6, and in line therewith, is a plunger member 8, the lower end of which may extend into the cavity of the bushing 7. As shown, the plunger 8 is provided with means for raising and lowering it vertically above the outlet 6, and also with means for giving it a rotary motion around its vertical axis.

The vertical reciprocating motion of the plunger 8 may be produced by means of a fluid-pressure cylinder 10, the plunger 8 being suspended from the piston rod 11 of this cylinder. Pipes 12 and 13 are provided for introducing and removing air, water or other pressure fluid, and the flow of the pressure fluid in these pipes is controlled by proper valves and timing devices connected to operate in synchronism with the forming machine which receives the mold charges of glass from the feeder. Since these valves and timing devices are well known in the art, it is not considered necessary to illustrate them herein.

The plunger 8 carries a spur gear 15 which is driven by a pinion 16 carried by a vertical shaft 17 which is driven either continuously or intermittently from any suitable source of power, not shown. The spur gear 15 is made long enough to mesh with the pinion 16 throughout the longitudinal movement of the plunger 8.

Molten glass at its working temperature is a viscous fluid and tends to adhere firmly to any hot solid with which it comes in contact. I utilize these properties to mix the glass above the flow outlet 6. The glass adheres to that portion of the plunger 8 which is immersed in the glass and is dragged around with the plunger as the plunger rotates, thus setting up rotary currents in the glass which thoroughly mix the glass which lies between the plunger and the closed end of the forehearth with the hot glass coming directly from the main body of glass in the tank 2.

In order to assist the mixing or stirring action of the plunger 8, the sides of the plunger may be provided with channels, as shown at 18, or may be otherwise roughened, as desired.

The rotary plunger 8 may be operated in several ways. It may be raised and lowered only to adjust the effective area of the outlet 6, remaining stationary so far as vertical reciprocation is concerned during the discharge of the glass. When used in this manner the plunger may be rotated continuously or intermittently, and may be either rotated in one direction only or its direction of rotation may be reversed from time to time.

More usually, the plunger is not held in a stationary vertical position during the feeding operation, but will be operated to discharge the glass in discontinuous gathers or gobs, one of which is shown at 19 on the drawing. In producing such gathers or gobs, the plunger is reciprocated vertically above the outlet 6 and during its descent exerts an impulse upon the issuing glass which maintains the cross section of the glass and may be utilized to control its shape. Shears 20 are indicated diagrammatically on Fig. 1 for severing the gathers after they are completely formed.

When the apparatus is used in this gob-feeding manner, the rotation of the plunger 8 may take place either at the top of the plunger stroke only, at the bottom of the plunger stroke only, or at an intermediate point in the ascent or descent of the plunger; or the plunger may be rotated continuously throughout its cycle of vertical reciprocation.

The particular manner in which the plunger is rotated depends upon various operating conditions such as the difference in temperature between the glass in the tank and the glass in the forehearth, the size of the gathers, and the degree of uniformity in temperature that is required to produce finished glassware of the desired quality.

Pipes 22 are shown extending through openings 23 in the side wall of the forehearth 5, and these pipes may be used to supply heating flames or streams of air for cooling, as may be required. Thus the pipe 22 between the plunger 8 and the closed outer end of the forehearth may be used to produce a heating flame, and the pipes between the main tank 2 and the plunger 8 may be used to supply air blasts for cooling the incoming hot glass to the temperature of the colder glass already in the front of the forehearth.

While I prefer ordinarily to employ my invention in connection with the feeding of glass from tank furnaces, it will be understood that it may also be employed in delivering glass from pots or other kinds of containers. It may also be employed with advantage in the production of blown glassware directly from a body of molten glass contained in a receptacle, according to the principles described and claimed in my prior application for Letters Patent filed July 8, 1921, Serial No. 483,234.

In view of the many possible variations in carrying out my invention, it will be understood that no limitations are to be imposed thereon except such as are indicated in the appended claims.

I claim as my invention:

1. Apparatus for producing mold charges of molten glass comprising a container for the glass having a discharge outlet, and a rotatable flow-controlling member disposed in line with said outlet, said flow-controlling member having a corrugated surface immersed in the glass.

2. Apparatus for producing mold charges of molten glass comprising a container for the glass having a discharge outlet and a rotatable and longitudinally movable flow-controlling member disposed in line with said outlet, said flow-controlling member having a corrugated surface immersed in the glass.

3. Apparatus for producing mold charges of molten glass comprising a container for the glass having a downwardly opening discharge outlet and a rotatable vertical member disposed above said outlet, the said vertical member having an externally non-spirally grooved portion immersed in the glass.

4. Apparatus for producing mold charges of molten glass comprising a container for the glass having a downwardly opening discharge outlet and a rotatable and longitudinally movable vertical member disposed above said outlet, the said vertical member having an externally non-spirally grooved portion immersed in the glass.

5. Apparatus for producing mold charges of molten glass, comprising a container for the glass provided with a well terminating in a discharge outlet, means for maintaining the homogeneity of the glass in the well and controlling its issuance through the outlet, comprising a refractory implement having non-spiral grooves in its lower portion, means for periodically moving said implement toward and from the outlet, and means for rotating said implement within said well.

6. Apparatus for producing mold charges of molten glass, comprising a container for the glass provided with a well terminating in a discharge outlet, means for maintaining the homogeneity of the glass in the well and controlling its issuance through the outlet, comprising a refractory implement having non-spiral projections on its lower portion, means for periodically moving said implement toward and from the outlet, and means for rotating said implement within said well.

7. Apparatus for producing mold charges of molten glass, comprising a container for the glass having a discharge outlet, means for maintaining the homogeneity of the glass adjacent the outlet and controlling its issuance through the outlet, comprising a refractory implement having non-spiral projections on its lower portion, means for periodically moving said implement toward and from the outlet, and means for rotating said implement.

8. Apparatus for producing mold charges of molten glass, comprising a container for the glass having a discharge outlet, means for maintaining the homogeneity of the glass adjacent to the outlet and controlling its issuance through the outlet, comprising a refractory implement having longitudinally extending grooves in its lower portion, means for periodically moving said implement toward and from the outlet, and means for rotating said implement.

9. Apparatus for producing homogeneous mold charges of molten glass, comprising a container for the glass provided with a well terminating in a discharge outlet, and a rotatable and reciprocable plunger associated with said well, said plunger having non-spiral grooves whereby it is made additionally effective in establishing circular currents in the glass in the well.

10. Apparatus for producing homogeneous mold charges of molten glass, comprising a container for the glass provided with a discharge outlet, and a rotatable and reciprocable plunger associated with the outlet, said plunger having non-spiral grooves whereby it is made additionally effective in establishing circular currents in the glass adjacent to the outlet.

11. Apparatus for producing mold charges of glass, comprising a container for the glass having a discharge outlet and a discharge-controlling member adjacent thereto and provided with non-spiral grooves, and means for rotating said member about a longitudinal axis.

12. Apparatus for producing mold charges of glass, comprising a container for the glass having a discharge outlet and a discharge-controlling member adjacent thereto and provided with non-spiral projections, and means for rotating said member about a longitudinal axis.

13. Apparatus for producing mold charges of molten glass, comprising a container having a discharge outlet, a rotatable member provided with external longitudinally extending grooves for stirring the glass, and means for moving such implement periodically toward and from the outlet.

14. Apparatus for producing mold charges of molten glass, comprising a container having a discharge outlet, a rotatable member provided with external longitudinally extending projections for stirring the glass, and means for moving such implement periodically toward and from the outlet.

15. In apparatus for controlling the flow of molten glass through a discharge aperture, a flow regulating implement having a longitudinally corrugated portion extending into the glass in axial alignment with said aperture.

16. In apparatus for controlling the flow of molten glass through a discharge aperture, a rotary flow regulating implement having a portion extending into the glass in axial alignment with said aperture and provided with non-spiral corrugations on its external surface.

17. In glass feeding apparatus, two cooperative flow regulating members, one comprising a container for molten glass having a discharge aperture and the other comprising an implement extending into the glass adjacent to the aperture, one of said flow regulating members having non-spiral projections immersed in the glass.

18. In glass feeding apparatus, two cooperative flow regulating members, one comprising a container for molten glass having a discharge aperture and the other comprising an implement extending into the glass adjacent to the aperture, one of said flow regulating members having non-spiral projections immersed in the glass, and means for rotating one of said flow regulating members.

19. In glass feeding apparatus, two cooperative flow regulating members, one comprising a container for molten glass having a discharge aperture and the other comprising an implement extending into the glass adjacent to the aperture, one of said flow regulating members having non-spiral projections immersed in the glass, and means for moving one of said flow regulating members relatively to the other.

20. In glass feeding apparatus, two cooperative flow regulating members, one comprising a container for molten glass having a submerged discharge aperture and the other comprising an implement extending into the glass substantially in axial alignment with said aperture, one of said flow regulating members having non-spiral projections extending into the glass around the axial line of the outlet, and means for rotating one of said flow regulating members about the axial line of the outlet.

In testimony whereof I, the said GEORGE E. HOWARD, have hereunto set my hand.

GEORGE E. HOWARD